United States Patent
Sakuma et al.

(10) Patent No.: US 9,487,230 B2
(45) Date of Patent: Nov. 8, 2016

(54) POWER STEERING DEVICE, AND CONTROL DEVICE USED FOR SAME

(71) Applicant: HITACHI AUTOMOTIVE SYSTEMS STEERING, LTD., Hiki-gun, Saitama (JP)

(72) Inventors: Haruto Sakuma, Novi, MI (US); Masaki Kodato, Sagamihara (JP); Kazuya Yamano, Yamato (JP)

(73) Assignee: HITACHI AUTOMOTIVE SYSTEMS STEERING, LTD., Saitama (JP)

( * ) Notice: Subject to any disclaimer, the term of this patent is extended or adjusted under 35 U.S.C. 154(b) by 0 days.

(21) Appl. No.: 14/773,590

(22) PCT Filed: Jan. 27, 2014

(86) PCT No.: PCT/JP2014/051638
§ 371 (c)(1),
(2) Date: Sep. 8, 2015

(87) PCT Pub. No.: WO2014/156266
PCT Pub. Date: Oct. 2, 2014

(65) Prior Publication Data
US 2016/0023678 A1  Jan. 28, 2016

(30) Foreign Application Priority Data
Mar. 29, 2013  (JP) ................ 2013-072133

(51) Int. Cl.
*B62D 5/04* (2006.01)
*B62D 6/00* (2006.01)

(52) U.S. Cl.
CPC .............. *B62D 5/0463* (2013.01); *B62D 5/04* (2013.01); *B62D 5/0421* (2013.01); *B62D 5/0481* (2013.01); *B62D 6/00* (2013.01)

(58) Field of Classification Search
CPC .... B62D 5/0463; B62D 5/0421; B62D 5/04; B62D 6/00; B62D 5/0481
USPC ......................................................... 701/41
See application file for complete search history.

(56) References Cited

U.S. PATENT DOCUMENTS

| 2003/0100981 | A1  | 5/2003 | Suzuki |
| 2006/0086560 | A1* | 4/2006 | Furusho ............... B62D 5/0463 180/446 |
| 2010/0228440 | A1* | 9/2010 | Yamazaki ............. B62D 6/008 701/41 |

FOREIGN PATENT DOCUMENTS

| JP | 2003-160053 A | 6/2003 |
| JP | 2003-205849 A | 7/2003 |
| JP | 2003-327137 A | 11/2003 |
| JP | 2007-008299 A | 1/2007 |
| JP | 2011-105190 A | 6/2011 |
| JP | 2013-184622 A | 9/2013 |

* cited by examiner

*Primary Examiner* — Brian P Sweeney
(74) *Attorney, Agent, or Firm* — Foley & Lardner LLP

(57) ABSTRACT

For compensation for loss of a steering assist force due to friction of a steering mechanism, when calculating a friction correction value for the compensation, in an electronic control unit 6, a static friction and a kinetic friction are distinguished, and the calculation is made by combining the static friction correction value Sf and the kinetic friction correction value Kf according to each friction. It is therefore possible to make a proper friction loss compensation according to type of the friction.

17 Claims, 4 Drawing Sheets

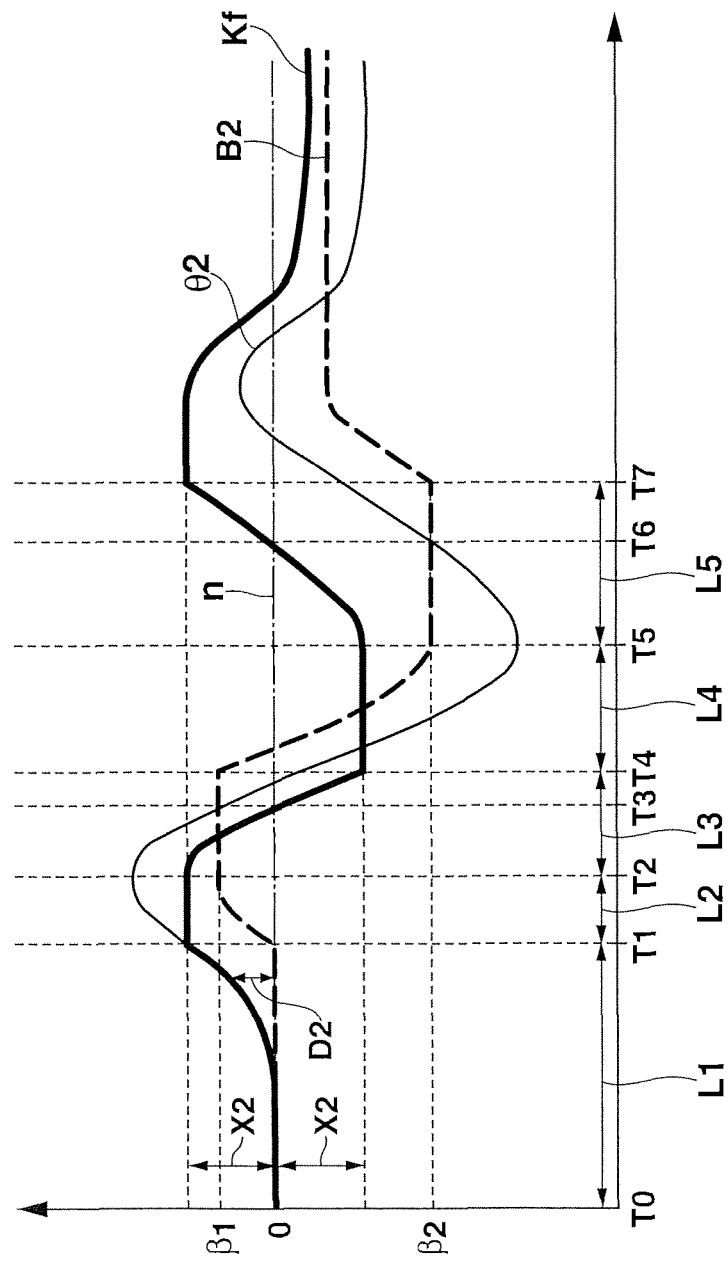

POWER STEERING DEVICE, AND CONTROL DEVICE USED FOR SAME

TECHNICAL FIELD

The present invention relates to a power steering device applied to, for instance, a vehicle and relates to a control device used for this power steering device.

BACKGROUND ART

As a related art power steering device applied to the vehicle, for instance, there has been known a power steering device disclosed in the following Patent Document.

That is, the power steering device disclosed in this Patent Document brings about an improvement in steering feeling by changing a friction correction value according to a steering angle in each state of a "forward state" in which directions of a steering torque and a steering angular velocity are the same and a "backward state" in which these directions are different.

CITATION LIST

Patent Document

Patent Document 1: Japanese Patent Application Publication No. JP2011-105190

SUMMARY OF THE INVENTION

Technical Problem

Here, as the friction generated upon steering, there are a static friction (hereinafter, simply called "static friction") generated in a state in which an output shaft does not respond to or follow a rotation of an input shaft yet and only the input shaft rotates and a kinetic friction (or a dynamic friction) (hereinafter, simply called "kinetic friction") generated in a state in which the output shaft rotates while responding to or following the rotation of the input shaft. Further, these frictions are different in magnitude.

In the related art power steering device, however, since the friction correction value is determined according to a magnitude of the steering angle without particularly distinguishing these frictions, there is a problem of not being able to make a proper friction loss compensation according to a type of the friction.

The present invention was made in view of the above technical problem. An object of the present invention is therefore to provide a power steering device that is capable of making the proper friction loss compensation according to the type of the friction.

Solution to Problem

An invention recited in claim 1 is characterized in that, in particular, a command current calculating section calculating a motor command current that is a command current to the electric motor; a static friction correction value calculating section calculating a static friction correction value on the basis of the input shaft rotation angle signal; a kinetic friction correction value calculating section calculating a kinetic friction correction value on the basis of the output shaft rotation angle signal; a current correction value calculating section calculating a command current correction value on the basis of the static friction correction value and the kinetic friction correction value; and a command current correcting section correcting the motor command current on the basis of the command current correction value, are provided.

Inventions recited in claims 2 and 3 are characterized in that, in particular, a command current calculating section calculating a motor command current that is a command current to the electric motor; a static friction correction value calculating section calculating a static friction correction value that, when the input shaft rotation angle signal changes so as to increase toward one direction of right and left steering directions, increases according to a change amount of the input shaft rotation angle signal, and when the input shaft rotation angle signal changes so as to increase toward the other direction of the right and left steering directions, decreases according to a change amount of the input shaft rotation angle signal; a kinetic friction correction value calculating section calculating a kinetic friction correction value that, when the output shaft rotation angle signal changes so as to increase toward the one direction, increases according to a change amount of the output shaft rotation angle signal, and when the output shaft rotation angle signal changes so as to increase toward the other direction, decreases according to a change amount of the output shaft rotation angle signal, and the kinetic friction correction value being set to a smaller value than the static friction correction value; a current correction value calculating section calculating a command current correction value that is a difference between the static friction correction value and the kinetic friction correction value and has a maximum value and a minimum value; and a command current correcting section correcting the motor command current so that when the command current correction value is greater than a medium value between the maximum value and the minimum value, the steering assist force to the one direction is increased, and so that when the command current correction value is smaller than the medium value, the steering assist force to the other direction is increased, are provided.

Effects of the Invention

According to the invention recited in claim 1, for compensation for loss of a steering assist force due to the friction, when calculating the friction correction value for the compensation, the static friction and the kinetic friction are distinguished, and the calculation is made by combining the static friction correction value and the kinetic friction correction value according to each friction. Therefore, it is possible to make the proper friction loss compensation according to the type of the friction.

More specifically, by setting the static friction correction value on the basis of the input shaft rotation angle, it is possible to suppress an increase in steering load due to dull movement of the steering mechanism when starting to turn the steering wheel. Also, by setting the kinetic friction correction value on the basis of the output shaft rotation angle, it is possible to suppress an increase in steering load due to friction of the steering mechanism after the steering mechanism works.

According to the inventions recited in claims 2 and 3, the command current correction value is determined by the difference between the static friction correction value and the kinetic friction correction value. Thus, as compared with a case where the command current correction value is merely determined by changing the static friction correction value and the kinetic friction correction value, a smooth change of the command current correction value can be obtained. This can bring about an improvement in steering feeling.

BRIEF DESCRIPTION OF THE DRAWINGS

FIG. 5 is a time chart for explaining calculation of a kinetic friction correction value calculated in a kinetic friction correction value calculating section shown in FIG. 3.

EMBODIMENTS FOR CARRYING OUT THE INVENTION

An embodiment of the power steering device of the present invention will be explained below on the basis of the drawings. In the following description, the power steering device will be explained with the power steering device of the present invention that is applied to a conventional power steering device of the vehicle taken for example.

Figure 1:
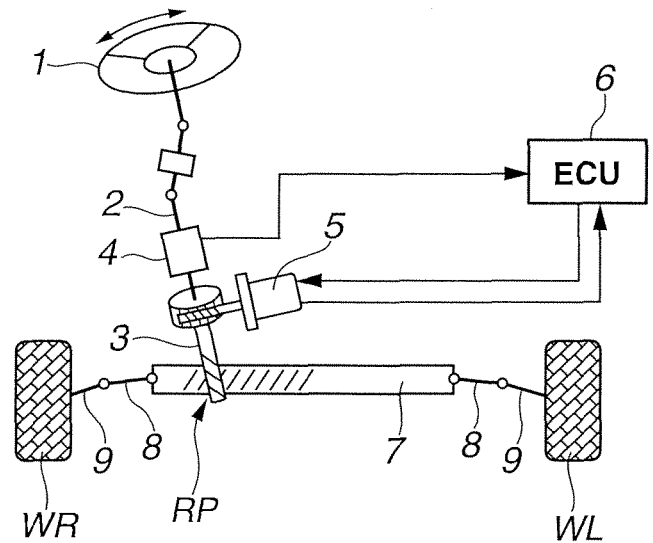
FIG. 1 is a system configuration diagram of a power steering device according to the present invention.

FIG. 1 is a schematic view of the power steering device to explain a system configuration of the power steering device of the present invention.

The power steering device shown in FIG. 1 is formed mainly by an input shaft 2 whose one end side is connected to a steering wheel 1 so as to be able to rotate integrally with the steering wheel 1, an output shaft 3 whose one end side is relatively rotatably connected to the other end side of the input shaft 2 through a torsion bar (not shown) and whose other end side is linked with steered road wheels WL, WR through a rack-and-pinion gear mechanism RP that is a conversion mechanism, a torque sensor 4 that is set at an outer periphery of the input shaft 2 and detects a steering input torque on the basis of a relative rotation displacement amount between the input shaft 2 and the output shaft 3, an electric motor 5 that provides the output shaft 3 with a steering assist torque according to a steering torque of a driver on the basis of each detection result of the torque sensor 4, a steering angle sensor and a vehicle speed sensor (both not shown), and an electronic control unit 6 that controls drive of the electric motor 5. Here, a steering mechanism of the present invention is formed by the input shaft 2, the output shaft 3 and the rack-and-pinion gear mechanism RP.

The rack-and-pinion gear mechanism RP is configured so that a pinion gear (not shown) provided at an outer periphery of the other end portion of the output shaft 3 and a rack gear (not shown) provided within a predetermined shaft direction area of a rack shaft 7 that is placed at almost right angles to the other end portion of the output shaft 3 are engaged with each other, and the rack shaft 7 moves in the shaft direction according to a rotation direction of the output shaft 3. Both ends of the rack shaft 7 are linked with the respective steered road wheels WR and WL through tie rods 8, 8 and knuckle arms 9, 9. When the rack shaft 7 moves in the shaft direction, each of the knuckle arms 9, 9 is pulled through the respective tie rods 8, 8, thereby changing directions of the steered road wheels WR and WL.

Figure 2:
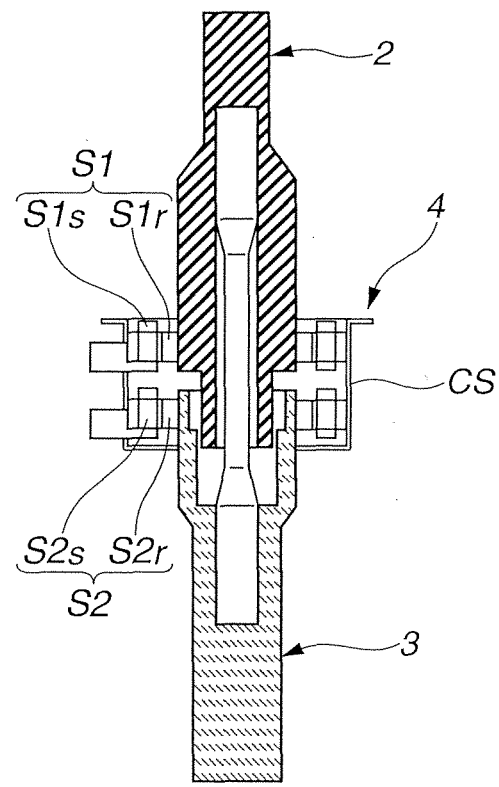
FIG. 2 is an enlarged longitudinal cross section of a connecting part of an input shaft and an output shaft, shown in FIG. 1, and its surroundings.

FIG. 2 is a longitudinal cross section of a connecting part of the input shaft 2 and the output shaft 3 and its surroundings, including the torque sensor 4.

As shown in FIG. 2, the torque sensor 4 is formed mainly by a casing CS provided so as to surround the connecting part of the input shaft 2 and the output shaft 3, a first rotation angle sensor S1, formed by e.g. a resolver, which is interposed between an inner circumferential surface of the casing CS and an outer circumferential surface of the input shaft 2 and detects a rotation displacement of the input shaft 2, and a second rotation angle sensor S2, formed by e.g. a resolver, which is interposed between the inner circumferential surface of the casing CS and an outer circumferential surface of the output shaft 3 and detects a rotation displacement of the output shaft 3. The torque sensor 4 detects the steering torque inputted by driver's steering operation by detecting the relative rotation displacement amount between the input shaft 2 and the output shaft 3 based on torsion deformation (twist) of the torsion bar by the first and second rotation angle sensors S1 and S2.

The first and second rotation angle sensors S1 and S2 are both a well-known variable reluctance (VR) type resolver. That is, the first rotation angle sensor S1 has a ring-shaped first rotor S1$r$ that is fitted onto the outer circumferential surface of the input shaft 2 so as to be able to rotate integrally with the input shaft 2 and a first stator S1$s$ that is fixed to the casing CS and positioned at an outer circumferential side of the first rotor S1$r$ through a certain gap so as to overlap with the first rotor Sir in a radial direction. Likewise, the second rotation angle sensor S2 has a ring-shaped second rotor S2$r$ that is fitted onto the outer circumferential surface of the output shaft 3 so as to be able to rotate integrally with the output shaft 3 and a second stator S2$s$ that is fixed to the casing CS and positioned at an outer circumferential side of the second rotor S2$r$ through a certain gap so as to overlap with the second rotor S2$r$ in a radial direction.

Figure 3:
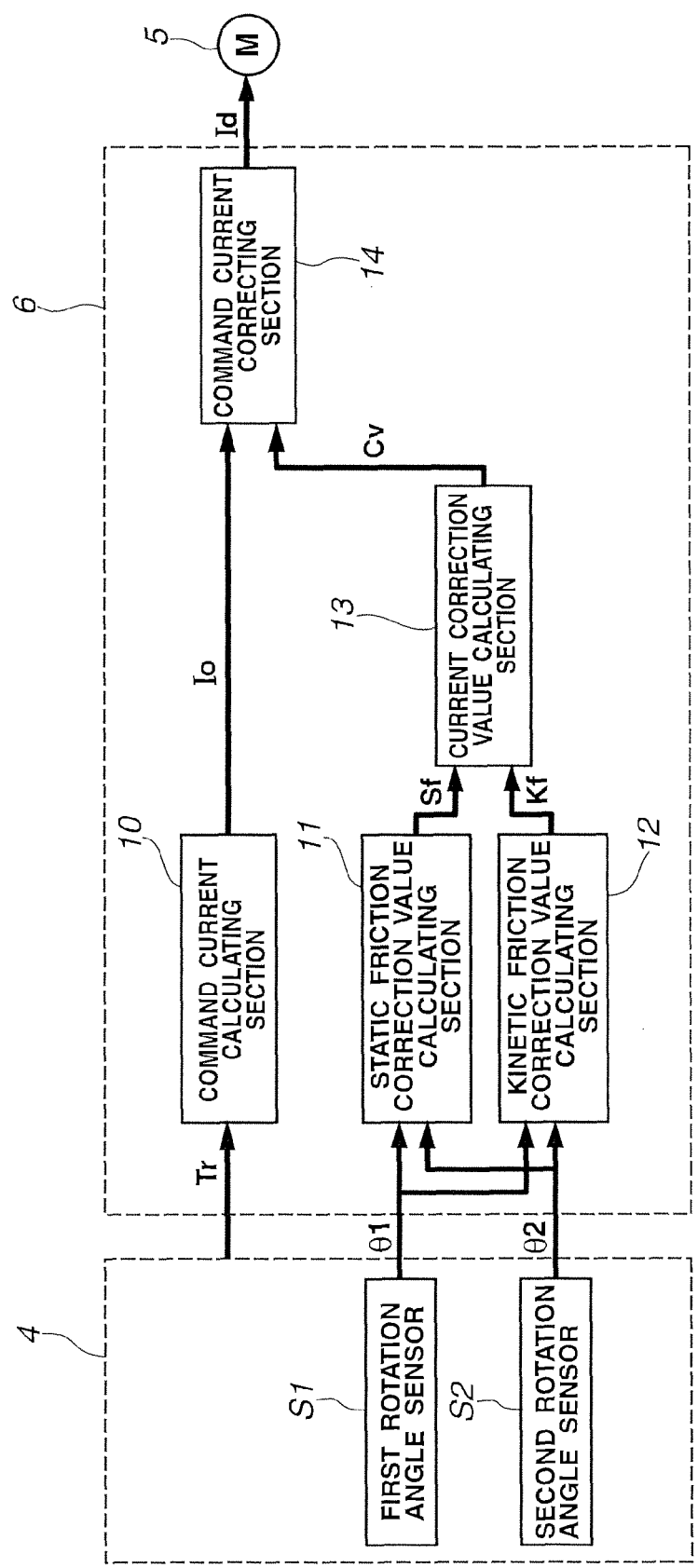
FIG. 3 is a control block diagram of a control unit shown in FIG. 1.

FIG. 3 is a control block diagram showing a calculation circuit configuration in the electronic control unit 6.

The electronic control unit 6 shown in FIG. 3 has a command current calculating section 10 that calculates, on the basis of a vehicle operating condition (after-mentioned sensor signals), a motor command current Io that is a command current value to the electric motor 5, a static friction correction value calculating section 11 that calculates a static friction correction value Sf for static friction correction of the steering mechanism, a kinetic friction correction value calculating section (or a dynamic friction correction value calculating section) 12 that calculates a kinetic friction correction value (or a dynamic friction correction value) Kf for kinetic friction correction of the steering mechanism, a current correction value calculating section 13 that calculates a command current correction value Cv on the basis of the static friction correction value Sf calculated by the static friction correction value calculating section 11 and the kinetic friction correction value Kf calculated by the kinetic friction correction value calculating section 12, and a command current correcting section 14 that corrects the motor command current Io on the basis of the command current correction value Cv calculated by the current correction value calculating section 13.

The command current calculating section 10 calculates the motor command current Io on the basis of an output signal Tr of the torque sensor 4, an output signal 8 of a motor rotation angle sensor provided at the electric motor 5, an output signal θ of the steering angle sensor, an output signal V of the vehicle speed sensor, etc. which are inputted to the command current calculating section 10. The command current calculating section 10 then outputs this motor command current Io to the command current correcting section 14.

The static friction correction value calculating section 11 calculates the static friction correction value Sf on the basis of the output signals θ1 and θ2 of the first and second rotation angle sensors S1 and S2, which are inputted to the static friction correction value calculating section 11. The static friction correction value calculating section 11 then outputs this static friction correction value Sf to the current correction value calculating section 13. The static friction correction value Sf is a value calculated on the basis of a difference D1 between the input shaft rotation angle θ1 and a reference value B1. The reference value B1 is basically set so as to be kept at a same value in an area where the difference D1 from the input shaft rotation angle θ1 is smaller than a predetermined value X1. On the other hand, in an area where the difference D1 from the input shaft rotation angle θ1 is equal to or greater than the predetermined value X1, the reference value B1 is set so as to increase or decrease so that the difference D1 becomes a magnitude of the predetermined value X1 (so that the difference D1 is kept at a magnitude of the predetermined value X1). A more detailed calculation manner will be explained later. Further, this static friction correction value Sf is calculated and set to such a value that at least the command current correction value Cv does not exceed a static friction loss in the steering mechanism.

The kinetic friction correction value calculating section 12 calculates the kinetic friction correction value Kf on the basis of the output signals θ1 and θ2 of the first and second rotation angle sensors S1 and S2, which are inputted to the kinetic friction correction value calculating section 12. The kinetic friction correction value calculating section 12 then outputs this kinetic friction correction value Kf to the current correction value calculating section 13 with the kinetic friction correction value Kf set in a reverse direction (an opposite direction in a steering direction) with respect to the static friction correction value Sf. In the same manner as the static friction correction value Sf, this kinetic friction correction value Kf is a value calculated on the basis of a difference D2 between the output shaft rotation angle θ2 and a reference value B2. The reference value B2 is basically set so as to be kept at a same value in an area where the difference D2 from the output shaft rotation angle θ2 is smaller than a predetermined value X2. On the other hand, in an area where the difference D2 from the output shaft rotation angle θ2 is equal to or greater than the predetermined value X2, the reference value B2 is set so as to increase or decrease so that the difference D2 becomes a magnitude of the predetermined value X2 (so that the difference D2 is kept at a magnitude of the predetermined value X2). A more detailed calculation manner will be explained later. Further, also this kinetic friction correction value Kf is calculated and set to such a value that at least the command current correction value Cv does not exceed a kinetic friction loss in the steering mechanism.

The current correction value calculating section 13 adds the static friction correction value Sf outputted from the static friction correction value calculating section 11 and the kinetic friction correction value Kf outputted in the reverse direction with respect to the static friction correction value Sf from the kinetic friction correction value calculating section 12, namely that the current correction value calculating section 13 subtracts the kinetic friction correction value Kf from the static friction correction value Sf, and calculates the command current correction value Cv on the basis of a difference between both these friction correction values Sf and Kf. The current correction value calculating section 13 then outputs this command current correction value Cv to the command current correcting section 14.

The command current correcting section 14 corrects the motor command current Io on the basis of the command current correction value Cv outputted from the current correction value calculating section 13. The command current correcting section 14 then outputs a motor drive current Id that is obtained by this correction to the electric motor 5.

Figure 4:
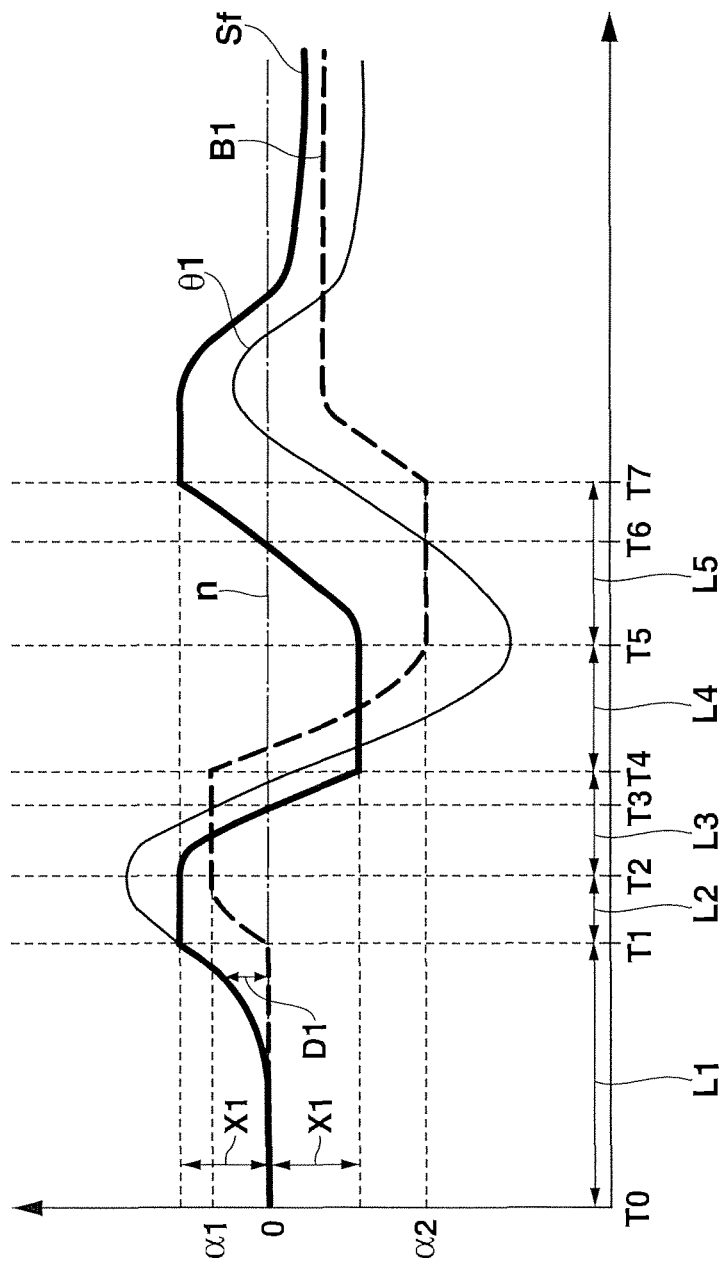
FIG. 4 is a time chart for explaining calculation of a static friction correction value calculated in a static friction correction value calculating section shown in FIG. 3.

FIG. 4 is a time chart showing a calculation result of the reference value B1 and the static friction correction value Sf in the static friction correction value calculating section 11. In the drawing, a dashed line n indicates a steering angle neutral point. The input shaft rotation angle θ1 that is the output signal of the first rotation angle sensor S1 is shown by a thin solid line, and an upper side with respect to the steering angle neutral point is a left steering, and a lower side with respect to the steering angle neutral point is a right steering. Further, the reference value B1 for calculating the static friction correction value Sf is shown by a broken line. The static friction correction value Sf obtained by the difference D1 between the input shaft rotation angle θ1 and the reference value B1 is shown by a thick solid line. A dotted line is the predetermined value X1 by which an upper limit value of the difference D1 is determined.

That is, as an example, a case where the steering operation to right or left direction is performed from a neutral state of the steering wheel 1 (i.e. from a straight-ahead driving state) will be explained. As shown in FIG. 4, first, when steering to the left direction, in a segment L1 from a time point T0 to a time point T1, since the difference D1 between the input shaft rotation angle θ1 and the reference value B1 is less than the predetermined value X1, the reference value B1 is kept at the same value (here, at zero) without increasing. As a result, the static friction correction value Sf obtained by the difference D1 increases according to the input shaft rotation angle θ1.

Subsequently, when the difference D1 between the input shaft rotation angle θ1 and the reference value B1 reaches the predetermined value X1 at the time point T1, in a segment L2 from the time point T1 to a time point T2 at which the difference D1 between the input shaft rotation angle θ1 and the reference value B1 falls below the predetermined value X1, the reference value B1 increases so that the difference D1 becomes the magnitude of the predetermined value X1 (so that the difference D1 is kept at the magnitude of the predetermined value X1). As a result, the static friction correction value Sf obtained by the difference D1 is kept at the predetermined value X1 as it stands.

Afterwards, when the steering direction is changed from the left direction toward the right direction at the time point T2 and the difference D1 between the input shaft rotation angle θ1 and the reference value B1 is less than the predetermined value X1 again, in a segment L3 from the time point T2 to a time point T4 at which the difference D1 between the input shaft rotation angle θ1 and the reference value B1 reaches the predetermined value X1 again, in the same manner as the segment L1, the reference value B1 is kept at the same value (here, at a reference value α1 of the time point T2). As a result, the static friction correction value Sf obtained by the difference D1 decreases according to the input shaft rotation angle θ1.

In this manner, by controlling the static friction correction value Sf calculated on the basis of the difference D1 between the input shaft rotation angle θ1 and the reference value B1 so that the static friction correction value Sf basically follows the input shaft rotation angle θ1 when the steering direction is changed to the right direction, a change of the command current correction value Cv calculated on the basis of the static friction correction value Sf can be smooth.

Subsequently, when the difference D1 between the input shaft rotation angle θ1 and the reference value B1 reaches the predetermined value X1 at the time point T4, in a segment L4 from the time point T4 to a time point T5 at which the difference D1 between the input shaft rotation angle θ1 and the reference value B1 falls below the predetermined value X1, the reference value B1 decreases so that the difference D1 becomes the magnitude of the predetermined value X1 (so that the difference D1 is kept at the magnitude of the predetermined value X1). As a result, the static friction correction value Sf obtained by the difference D1 is kept at the predetermined value X1 as it stands.

Afterwards, when the steering direction is changed from the right direction toward the left direction at the time point T5 and the difference D1 between the input shaft rotation angle θ1 and the reference value B1 is less than the predetermined value X1 again, in a segment L5 from the time point T5 to a time point T7 at which the difference D1 between the input shaft rotation angle θ1 and the reference value B1 reaches the predetermined value X1 again, in the same manner as the segment L3, the reference value B1 is kept at the same value (here, at a reference value α2 of the time point T5). As a result, also in this segment, by controlling the static friction correction value Sf obtained by the difference D1 so that the static friction correction value Sf basically follows the input shaft rotation angle θ1, the smooth change of the command current correction value Cv can be achieved.

FIG. 5 is a time chart showing calculation results of the reference value B2 and the kinetic friction correction value Kf in the kinetic friction correction value calculating section 12. In the drawing, in the same manner as FIG. 4, a dashed line n indicates a steering angle neutral point. The output shaft rotation angle θ2 that is the output signal of the second rotation angle sensor S2 is shown by a thin solid line. The reference value B2 for calculating the kinetic friction correction value Kf is shown by a broken line. The kinetic friction correction value Kf obtained by the difference D2 between the output shaft rotation angle θ2 and the reference value B2 is shown by a thick solid line. Further, the predetermined value X2 by which an upper limit value of the difference D2 is determined is shown by a dotted line. Direction of the steering is the same as that of the case of the static friction correction value Sf.

That is, as shown in FIG. 5, when steering to the left direction, in a segment L1 from a time point T0 to a time point T1, since the difference D2 between the output shaft rotation angle θ2 and the reference value B2 is less than the predetermined value X2, the reference value B2 is kept at the same value (here, at zero). As a result, the kinetic friction correction value Kf obtained by the difference D2 increases according to the output shaft rotation angle θ2.

Subsequently, when the difference D2 between the output shaft rotation angle θ2 and the reference value B2 reaches the predetermined value X2 at the time point T1, in a segment L2 from the time point T1 to a time point T2 at which the difference D2 between the output shaft rotation angle θ2 and the reference value B2 falls below the predetermined value X2, the reference value B2 increases so that the difference D2 becomes the magnitude of the predetermined value X2 (so that the difference D2 is kept at the magnitude of the predetermined value X2). As a result, the kinetic friction correction value Kf obtained by the difference D2 is kept at the predetermined value X2 as it stands.

Afterwards, when the steering direction is changed from the left direction toward the right direction at the time point T2 and the difference D2 between the output shaft rotation angle θ2 and the reference value B2 is less than the predetermined value X2 again, in a segment L3 from the time point T2 to a time point T4 at which the difference D2 between the output shaft rotation angle θ2 and the reference value B2 reaches the predetermined value X2 again, in the same manner as the segment L1, the reference value B2 is kept at the same value (here, at a reference value β1 of the time point T2). As a result, the kinetic friction correction value Kf obtained by the difference D2 decreases according to the output shaft rotation angle θ2. In this manner, also regarding the kinetic friction correction value Kf, by controlling the kinetic friction correction value Kf calculated on the basis of the difference D2 between the output shaft rotation angle θ2 and the reference value B2 so that the kinetic friction correction value Kf basically follows the output shaft rotation angle θ2, a change of the command current correction value Cv calculated on the basis of the kinetic friction correction value Kf can be smooth.

Subsequently, when the difference D2 between the output shaft rotation angle θ2 and the reference value B2 reaches the predetermined value X2 at the time point T4, in a segment L4 from the time point T4 to a time point T5 at which the difference D2 between the output shaft rotation angle θ2 and the reference value B2 falls below the predetermined value X2, the reference value B2 decreases so that the difference D2 becomes the magnitude of the predetermined value X2 (so that the difference D2 is kept at the magnitude of the predetermined value X2). As a result, the kinetic friction correction value Kf obtained by the difference D2 is kept at the predetermined value X2 as it stands.

Afterwards, when the steering direction is changed from the right direction toward the left direction at the time point T5 and the difference D2 between the output shaft rotation angle θ2 and the reference value B2 is less than the predetermined value X2 again, in a segment L5 from the time point T5 to a time point T7 at which the difference D2 between the output shaft rotation angle θ2 and the reference value B2 reaches the predetermined value X2 again, in the same manner as the segment L3, the reference value B2 is kept at the same value (here, at a reference value β2 of the time point T5). As a result, also in this segment, by controlling the kinetic friction correction value Kf obtained by the difference D2 so that the kinetic friction correction value Kf basically follows the output shaft rotation angle θ2, the smooth change of the command current correction value Cv can be achieved.

As explained above, according to the power steering device of the present invention, regarding compensation for loss of a steering assist force due to the friction, when calculating the friction correction value for the compensation, the static friction and the kinetic friction are distinguished, and the calculation is made by combining the static friction correction value Sf and the kinetic friction correction value Kf according to each friction. Therefore, it is possible to make the proper friction loss compensation according to the type of the friction.

More specifically, by setting the static friction correction value Sf on the basis of the input shaft rotation angle θ1, it is possible to suppress an increase in steering load due to dull movement of the steering mechanism when starting to turn the steering wheel. Also, by setting the kinetic friction correction value Kf on the basis of the output shaft rotation angle θ2, it is possible to suppress an increase in steering load due to friction of the steering mechanism after the steering mechanism works.

Further, when calculating each of the both friction correction values Sf and Kf, the command current correction value Cv is determined by the difference between the static friction correction value Sf and the kinetic friction correction value Kf. Thus, as compared with a case where the command current correction value is merely determined by changing the static friction correction value Sf and the kinetic friction correction value Kf, the smooth change of the command current correction value Cv can be obtained. This can bring about an improvement in steering feeling.

In addition, with respect to the both friction correction values Sf and Kf, the respective upper limit values are provided so that the command current correction value does not exceed each friction loss in the steering mechanism. Therefore, each proportion of the friction correction values Sf and Kf for the steering assist force can be limited to within an appropriate range, and a proper steering assist to the steering load can be achieved.

Furthermore, in a related art technique, in a state in which a sign of the steering angular velocity changes a lot, e.g. when turning and holding the steering wheel, a sign of the friction correction value also changes according to the change of the sign of the steering angular velocity. Because of this, in a state in which the friction correction value is large, due to a wavy friction correction value, i.e. due to hunting, driver is subject to an odd or awkward steering feeling.

In contrast to this, in the present embodiment, each of the friction correction values Sf and Kf is set so that the greater the torsion amount to one side or the other side in the steering direction of each of the shafts 2 and 3, the more the friction correction values Sf and Kf increase (see each segment L1 in FIGS. 4 and 5). Further, when the differences D1 and D2 become greater than the predetermined values X1 and X2 respectively, each of the friction correction values Sf and Kf is set to the constant value (see each segment L2 in FIGS. 4 and 5). As a consequence, the steering load in each early stage of a steering angle change and a steered angle change can be lightened, and a stable steering can be achieved in the segment in which the torsion amount to one side or the other side in the steering direction of each of the shafts 2 and 3 becomes greater.

On the other hand, when the steering direction is changed to one side or the other side, each of the friction correction values Sf and Kf is set so that the differences D1 and D2 smoothly follow the rotation angles θ1 and θ2 respectively according to the change of the rotation angles θ1 and θ2 of the shafts 2 and 3 (see each segment L3 in FIGS. 4 and 5). Hence, excessive (sensitive) increase and decrease in the steering load, caused by a frequent change of the friction correction value like the related art, can be suppressed, and this brings about an improvement in steering feeling.

Further, by setting, as the friction correction values Sf and Kf, values that are obtained by multiplying the differences D1 and D2 by respective predetermined gains, or by setting, as the friction correction values Sf and Kf, values that are outputted by inputting the differences D1 and D2 into respective maps, it is possible to adjust the steering feeling.

Moreover, in the present embodiment, since the first rotation angle sensor S1 is formed as the torque sensor 4 and information from the torque sensor 4 which is required to set the steering assist force is used as the input shaft rotation angle θ1, there is no need to provide an additional steering angle sensor. This leads to simplification and cost reduction of the device.

Furthermore, by detecting the relative rotation of the input shaft 2 to the output shaft 3 by the torque sensor 4, since a rotation movement of the input shaft 2 relative to the output shaft 3 is the driver's steering operation, this could be incorporated into the static friction correction value Sf, and the steering wheel can be accurately rotated upon turning the steering wheel.

Here, in a case where the steering angle sensor is included depending on specifications of the device, instead of the torque sensor 4, the steering angle sensor could be used. Also in this case, the rotation movement of the steering wheel by the driver's steering operation can be detected by the steering angle sensor. Thus, this could be incorporated into the static friction correction value Sf, and the steering wheel can be accurately rotated upon turning the steering wheel.

The present invention is not limited to the configuration of the above embodiment. For instance, not only configuration of the steering mechanism and an assisting manner which are not directly connected to features of the present invention, but also a specific calculation manner of the command current correction value Cv based on the friction correction values Sf and Kf which is connected to the features of the present invention, could be changed or modified according to the specifications of a vehicle in which the power steering device of the present invention is mounted, as long as the above-mentioned effects can be obtained.

Technical ideas that can be understood from the embodiment described above, except contents recited in scope of claim for patent, will be explained below.

(a) In the power steering device recited in claim 2, in an area where a difference between a reference value and the input shaft rotation angle signal is smaller than a predetermined value, the static friction correction value changes on the basis of the difference, and in an area where the difference is equal to or greater than the predetermined value, the reference value is set so as to increase or decrease so that the difference is kept at the predetermined value.

According to the present invention, the static friction correction value is set so that the greater the torsion amount to one side or the other side in the right and left steering directions of the input shaft, the more the static friction correction value increases, and also so that the smaller the torsion amount, the more the static friction correction value decreases. With this setting, when the torsion amount greatly increases or decreases, i.e. when the steering operation is greatly changed, the static friction correction value can be provided while being increased according to the change of the steering operation. As a consequence, the steering load in an early stage of a steering angle change can be lightened.

(b) In the power steering device recited in (a), the static friction correction value is set on the basis of the difference, and the reference value is set so that when the difference reaches an upper limit value, the difference is kept at the upper limit value.

According to the present invention, by providing the upper limit value for the difference that is a base or basis of the static friction correction value, a proportion of the static friction correction value for the steering assist force can be limited to within an appropriate range, and also the static friction correction value is provided with a constant value. As a consequence, a stable steering can be achieved in the segment in which the torsion amount in the right and left steering directions of the input shaft becomes greater to one side or the other side.

(c) In the power steering device recited in (a), the static friction correction value is set on the basis of the difference, and when the input shaft rotation angle signal changes from a state in which the reference value and the input shaft rotation angle signal are same, in an area where the difference is smaller than the predetermined value, the reference value is kept at a same value.

According to the present invention, upon rotation of the input shaft in an area where the difference is smaller than the predetermined value, namely rotation of the input shaft due to wobble of the steering wheel which is not the steering operation, by setting the static friction correction value so as not to be changed, a stable steering feeling can be achieved.

(d) In the power steering device recited in (c), the static friction correction value is set on the basis of the difference, and in an area where the difference is equal to or greater than the predetermined value, the reference value gradually increases or decreases with the change of the input shaft rotation angle signal.

In this manner, by gradually increasing or decreasing the reference value so as not to rapidly change the static friction correction value, an odd or awkward steering feeling due to a sudden change of the steering assist force can be suppressed.

(e) In the power steering device recited in (a), when the difference repeats slight increase and alight decrease in the vicinity of the predetermined value, in an area where the difference becomes equal to or greater than a value that is obtained by subtracting a value of a range of the slight increase and decrease of the difference from the predetermined value, the static friction correction value is set kept or is set so that its change amount becomes small.

According to the present invention, it is possible to suppress an odd or awkward steering feeling caused by slight hunting of the static friction correction value when holding the steering wheel.

(f) In the power steering device recited in claim 2, in an area where a difference between a reference value and the output shaft rotation angle signal is smaller than a predetermined value, the kinetic friction correction value changes on the basis of the difference, and in an area where the difference is equal to or greater than the predetermined value, the reference value is set so as to increase or decrease so that the difference is kept at the predetermined value.

According to the present invention, the kinetic friction correction value is set so that the greater the torsion amount to one side or the other side in the right and left steering directions of the output shaft, the more the kinetic friction correction value increases, and also so that the smaller the torsion amount, the more the kinetic friction correction value decreases. With this setting, when the torsion amount greatly increases or decreases, i.e. when the steering operation is greatly changed, the kinetic friction correction value can be provided while being increased according to the change of the steering operation. As a consequence, the steering load in an early stage of a steered angle change can be lightened.

(g) In the power steering device recited in (f), the kinetic friction correction value is set on the basis of the difference, and the reference value is set so that when the difference reaches an upper limit value, the difference is kept at the upper limit value.

According to the present invention, by providing the upper limit value for the difference that is a base or basis of the kinetic friction correction value, a proportion of the kinetic friction correction value for the steering assist force can be limited to within an appropriate range, and also the kinetic friction correction value is provided with a constant value. As a consequence, a stable steering can be achieved in the segment in which the torsion amount in the right and left steering directions of the output shaft becomes greater to one side or the other side.

(h) In the power steering device recited in (f), when the difference repeats slight increase and alight decrease in the vicinity of the predetermined value, in an area where the difference becomes equal to or greater than a value that is obtained by subtracting a value of a range of the slight increase and decrease of the difference from the predetermined value, the kinetic friction correction value is set kept or is set so that its change amount becomes small.

According to the present invention, it is possible to suppress an odd or awkward steering feeling caused by slight hunting of the kinetic friction correction value when holding the steering wheel.

(i) In the power steering device recited in (f), the kinetic friction correction value is set on the basis of the difference, and in an area where the difference is equal to or greater than the predetermined value, the reference value gradually increases or decreases with the change of the output shaft rotation angle signal.

In this manner, by gradually increasing or decreasing the reference value so as not to rapidly change the kinetic friction correction value, an odd or awkward steering feeling due to a sudden change of the steering assist force can be suppressed.

(j) In the power steering device recited in claim 2, the first rotation angle sensor is formed by a steering angle sensor that detects the rotation angle of the input shaft.

Since rotation movement of the steering wheel by the driver's steering operation can be detected by the steering angle sensor, this could be incorporated into the static friction correction value, and the steering wheel can be accurately rotated upon turning the steering wheel.

(k) In the power steering device recited in claim 2, the first rotation angle sensor detects the relative rotation angle of the input shaft to the output shaft.

Since a rotation movement of the input shaft relative to the output shaft is the driver's steering operation, this could be incorporated into the static friction correction value, and the steering wheel can be accurately rotated upon turning the steering wheel.

(l) In the power steering device recited in claim 2, the first rotation angle sensor is formed by a torque sensor that detects, on the basis of a torsion amount of the torsion bar, a steering torque generated at the steering mechanism.

In this manner, since information from the torque sensor which is required to set the steering assist force is used as the input shaft rotation angle, there is no need to provide an additional steering angle sensor. This leads to simplification and cost reduction of the device.

(m) In the control device of the power steering device recited in claim 3, in an area where a difference between a reference value and the input shaft rotation angle signal is smaller than a predetermined value, the static friction correction value changes on the basis of the difference, and in an area where the difference is equal to or greater than the predetermined value, the reference value is set so as to increase or decrease so that the difference is kept at the predetermined value.

According to the present invention, the static friction correction value is set so that the greater the torsion amount to one side or the other side in the right and left steering directions of the input shaft, the more the static friction correction value increases, and also so that the smaller the torsion amount, the more the static friction correction value decreases. With this setting, when the torsion amount greatly increases or decreases, i.e. when the steering operation is greatly changed, the static friction correction value can be provided while being increased according to the change of the steering operation. As a consequence, the steering load in an early stage of a steering angle change can be lightened.

(n) In the control device of the power steering device recited in (m), the static friction correction value is set on the basis of the difference, and the reference value is set so that when the difference reaches an upper limit value, the difference is kept at the upper limit value.

According to the present invention, by providing the upper limit value for the difference that is a base or basis of the static friction correction value, a proportion of the static friction correction value for the steering assist force can be limited to within an appropriate range, and also the static friction correction value is provided with a constant value. As a consequence, a stable steering can be achieved in the segment in which the torsion amount in the right and left steering directions of the input shaft becomes greater to one side or the other side.

(o) In the control device of the power steering device recited in claim 3, in an area where a difference between a reference value and the output shaft rotation angle signal is smaller than a predetermined value, the kinetic friction correction value changes on the basis of the difference, and in an area where the difference is equal to or greater than the predetermined value, the reference value is set so as to increase or decrease so that the difference is kept at the predetermined value.

According to the present invention, the kinetic friction correction value is set so that the greater the torsion amount to one side or the other side in the right and left steering directions of the output shaft, the more the kinetic friction correction value increases, and also so that the smaller the torsion amount, the more the kinetic friction correction value decreases. With this setting, when the torsion amount greatly increases or decreases, i.e. when the steering operation is greatly changed, the kinetic friction correction value can be provided while being increased according to the change of the steering operation. As a consequence, the steering load in an early stage of a steered angle change can be lightened.

(p) In the control device of the power steering device recited in (o), the kinetic friction correction value is set on the basis of the difference, and the reference value is set so that when the difference reaches an upper limit value, the difference is kept at the upper limit value.

According to the present invention, by providing the upper limit value for the difference that is a base or basis of the kinetic friction correction value, a proportion of the kinetic friction correction value for the steering assist force can be limited to within an appropriate range, and also the kinetic friction correction value is provided with a constant value. As a consequence, a stable steering can be achieved in the segment in which the torsion amount in the right and left steering directions of the output shaft becomes greater to one side or the other side.

EXPLANATION OF REFERENCE

1 . . . steering wheel
2 . . . input shaft
3 . . . output shaft
4 . . . torque sensor (first and second rotation angle sensors)
5 . . . electric motor
6 . . . electronic control unit
10 . . . command current calculating section
11 . . . static friction correction value calculating section
12 . . . kinetic friction correction value calculating section
13 . . . current correction value calculating section command current correcting section
RP . . . rack-and-pinion gear mechanism (conversion mechanism)
Io . . . motor command current

The invention claimed is:

1. A power steering device comprising:
a steering mechanism formed by an input shaft that rotates according to a steering operation of a steering wheel, an output shaft that is connected to the input shaft through a torsion bar and a conversion mechanism that converts a rotation of the output shaft to a steered movement of a steered road wheel;
a first rotation angle sensor detecting a rotation angle of the input shaft or an input shaft rotation angle that is a relative rotation angle of the input shaft to the output shaft and outputting the rotation angle or the input shaft rotation angle as an input shaft rotation angle signal;
a second rotation angle sensor detecting a rotation angle of the output shaft and outputting the rotation angle as an output shaft rotation angle signal;
an electric motor providing a steering assist force to the steering mechanism; and
an electronic control unit controlling drive of the electric motor according to a vehicle operating condition, and the electronic control unit having;
  a command current calculating section calculating a motor command current that is a command current to the electric motor;
  a static friction correction value calculating section calculating a static friction correction value that, when the input shaft rotation angle signal changes so as to increase toward one direction of right and left steering directions, increases according to a change amount of the input shaft rotation angle signal, and when the input shaft rotation angle signal changes so as to increase toward the other direction of the right and left steering directions, decreases according to a change amount of the input shaft rotation angle signal;
  a kinetic friction correction value calculating section calculating a kinetic friction correction value that, when the output shaft rotation angle signal changes so as to increase toward the one direction, increases according to a change amount of the output shaft rotation angle signal, and when the output shaft rotation angle signal changes so as to increase toward the other direction, decreases according to a change amount of the output shaft rotation angle signal, and the kinetic friction correction value being set to a smaller value than the static friction correction value;
  a current correction value calculating section calculating a command current correction value that is a difference between the static friction correction value and the kinetic friction correction value and has a maximum value and a minimum value; and
  a command current correcting section correcting the motor command current so that when the command current correction value is greater than a medium value between the maximum value and the minimum value, the steering assist force to the one direction is increased, and so that when the command current correction value is smaller than the medium value, the steering assist force to the other direction is increased.

2. The power steering device as claimed in claim 1, wherein:
in an area where a difference between a reference value and the input shaft rotation angle signal is smaller than a predetermined value, the static friction correction value changes on the basis of the difference, and
in an area where the difference is equal to or greater than the predetermined value, the reference value is set so as to increase or decrease so that the difference is kept at the predetermined value.

3. The power steering device as claimed in claim 2, wherein:
the static friction correction value is set on the basis of the difference, and
the reference value is set so that when the difference reaches an upper limit value, the difference is kept at the upper limit value.

4. The power steering device as claimed in claim 2, wherein:
the static friction correction value is set on the basis of the difference, and
when the input shaft rotation angle signal changes from a state in which the reference value and the input shaft rotation angle signal are same, in an area where the difference is smaller than the predetermined value, the reference value is kept at a same value.

5. The power steering device as claimed in claim 4, wherein:
the static friction correction value is set on the basis of the difference, and
in an area where the difference is equal to or greater than the predetermined value, the reference value gradually increases or decreases with the change of the input shaft rotation angle signal.

6. The power steering device as claimed in claim 2, wherein:
in an area where a difference between a reference value and the output shaft rotation angle signal is smaller than a predetermined value, the kinetic friction correction value changes on the basis of the difference, and
in an area where the difference is equal to or greater than the predetermined value, the reference value is set so as to increase or decrease so that the difference is kept at the predetermined value.

7. The power steering device as claimed in claim 6, wherein:
the kinetic friction correction value is set on the basis of the difference, and
the reference value is set so that when the difference reaches an upper limit value, the difference is kept at the upper limit value.

8. The power steering device as claimed in claim 6, wherein:
the kinetic friction correction value is set on the basis of the difference, and
in an area where the difference is equal to or greater than the predetermined value, the reference value gradually increases or decreases with the change of the output shaft rotation angle signal.

9. The power steering device as claimed in claim 1, wherein:
the first rotation angle sensor is formed by a steering angle sensor that detects the rotation angle of the input shaft.

10. The power steering device as claimed in claim 1, wherein:
the first rotation angle sensor detects the relative rotation angle of the input shaft to the output shaft.

11. The power steering device as claimed in claim 1, wherein:
the first rotation angle sensor is formed by a torque sensor that detects, on the basis of a torsion amount of the torsion bar, a steering torque generated at the steering mechanism.

12. A control device of a power steering device that provides a steering assist force to a steered road wheel by an electric motor according to a steering operation of a steering wheel, the control device comprising:
a command current calculating section calculating a motor command current that is a command current to the electric motor;
a static friction correction value calculating section calculating a static friction correction value that, when an input shaft rotation angle signal changes so as to increase toward one direction of right and left steering directions, increases according to a change amount of the input shaft rotation angle signal, and when the input shaft rotation angle signal changes so as to increase toward the other direction of the right and left steering directions, decreases according to a change amount of the input shaft rotation angle signal;
a kinetic friction correction value calculating section calculating a kinetic friction correction value that, when an output shaft rotation angle signal changes so as to increase toward the one direction, increases according to a change amount of the output shaft rotation angle signal, and when the output shaft rotation angle signal changes so as to increase toward the other direction, decreases according to a change amount of the output shaft rotation angle signal, and the kinetic friction correction value being set to a smaller value than the static friction correction value;
a current correction value calculating section calculating a command current correction value that is a difference between the static friction correction value and the kinetic friction correction value and has a maximum value and a minimum value; and
a command current correcting section correcting the motor command current so that when the command current correction value is greater than a medium value between the maximum value and the minimum value, the steering assist force to the one direction is increased, and so that when the command current correction value is smaller than the medium value, the steering assist force to the other direction is increased.

13. The control device of the power steering device as claimed in claim 12, wherein:
in an area where a difference between a reference value and the input shaft rotation angle signal is smaller than a predetermined value, the static friction correction value changes on the basis of the difference, and
in an area where the difference is equal to or greater than the predetermined value, the reference value is set so as to increase or decrease so that the difference is kept at the predetermined value.

14. The control device of the power steering device as claimed in claim 13, wherein:
the static friction correction value is set on the basis of the difference, and the reference value is set so that when the difference reaches an upper limit value, the difference is kept at the upper limit value.

15. The control device of the power steering device as claimed in claim 12, wherein:
    in an area where a difference between a reference value and the output shaft rotation angle signal is smaller than a predetermined value, the kinetic friction correction value changes on the basis of the difference, and
    in an area where the difference is equal to or greater than the predetermined value, the reference value is set so as to increase or decrease so that the difference is kept at the predetermined value.

16. The control device of the power steering device as claimed in claim 15, wherein:
    the kinetic friction correction value is set on the basis of the difference, and
    the reference value is set so that when the difference reaches an upper limit value, the difference is kept at the upper limit value.

17. A power steering device comprising:
    a steering mechanism formed by an input shaft that rotates according to a steering operation of a steering wheel, an output shaft that is connected to the input shaft through a torsion bar and a conversion mechanism that converts a rotation of the output shaft to a steered movement of a steered road wheel;
    a first rotation angle sensor detecting a rotation angle of the input shaft or an input shaft rotation angle that is a relative rotation angle of the input shaft to the output shaft and outputting the rotation angle or the input shaft rotation angle as an input shaft rotation angle signal;
    a second rotation angle sensor detecting a rotation angle of the output shaft and outputting the rotation angle as an output shaft rotation angle signal;
    an electric motor providing a steering assist force to the steering mechanism; and
    an electronic control unit controlling drive of the electric motor according to a vehicle operating condition, and
    the electronic control unit having;
        a command current calculating section calculating a motor command current that is a command current to the electric motor;
        a static friction correction value calculating section calculating a static friction correction value on the basis of the input shaft rotation angle signal;
        a kinetic friction correction value calculating section calculating a kinetic friction correction value on the basis of the output shaft rotation angle signal;
        a current correction value calculating section calculating a command current correction value on the basis of the static friction correction value and the kinetic friction correction value; and
        a command current correcting section correcting the motor command current on the basis of the command current correction value.

* * * * *